US011349939B2

(12) United States Patent
Chunduru Venkata et al.

(10) Patent No.: US 11,349,939 B2
(45) Date of Patent: *May 31, 2022

(54) INTELLIGENT PROGRAMMABLE POLICIES FOR NETWORK FUNCTIONS

(71) Applicant: Verizon Patent and Licensing Inc., Basking Ridge, NJ (US)

(72) Inventors: Sivanaga Ravi Kumar Chunduru Venkata, Irving, TX (US); Raju Sharma, Raleigh, NC (US); Manish Srivastava, Frisco, TX (US); Susmitha Hymasree Pulakhandam, Irving, TX (US); Kumara B. Tamada, Cary, NC (US); Anuj Dutia, Irving, TX (US); Ramesh Nadella, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,408

(22) Filed: Feb. 16, 2021

(65) Prior Publication Data
US 2021/0168216 A1    Jun. 3, 2021

Related U.S. Application Data

(63) Continuation of application No. 16/723,287, filed on Dec. 20, 2019, now Pat. No. 10,951,719, which is a
(Continued)

(51) Int. Cl.
*G06F 15/16* (2006.01)
*H04L 67/51* (2022.01)
(Continued)

(52) U.S. Cl.
CPC .......... *H04L 67/16* (2013.01); *H04L 41/0843* (2013.01); *H04L 67/12* (2013.01)

(58) Field of Classification Search
CPC ...... H04L 67/16; H04L 67/12; H04L 41/0843
(Continued)

(56) References Cited

U.S. PATENT DOCUMENTS

| 6,449,650 B1 * | 9/2002 | Westfall | .............. H04L 12/5601 |
| | | | 709/227 |
| 8,260,918 B2 | 9/2012 | Matthews et al. | |

(Continued)

*Primary Examiner* — Moustafa M Meky

(57) ABSTRACT

Systems and methods described herein provide unified policy management framework network functions in enterprise networks. The systems and methods store an abstract micro-service template configured from predefined configuration elements; receive descriptive information for a vendor-specific micro-service that corresponds to the abstract micro-service template; solicit first customer labels for at least some of the predefined configuration elements associated with a group of users for a micro-service on a customer network; solicit second customer labels for other of the predefined configuration elements associated with applications used on the customer network; generate a vendor-agnostic micro-service template using the first customer labels, the second customer labels, and the abstract micro-service template; convert, based on the descriptive information, the vendor-agnostic micro-service template into a vendor-specific micro-service template for the customer; and generate, based on the vendor-specific micro-service template, a network policy for enforcement across multiple sites of the customer network.

20 Claims, 8 Drawing Sheets

Related U.S. Application Data continuation of application No. 16/017,592, filed on Jun. 25, 2018, now Pat. No. 10,554,765.

(51) Int. Cl.
*H04L 41/084* (2022.01)
*H04L 67/12* (2022.01)

(58) Field of Classification Search
USPC .......................................................... 709/220
See application file for complete search history.

(56) References Cited

U.S. PATENT DOCUMENTS

| | | |
|---|---|---|
| 9,071,611 B2 | 6/2015 | Yadav et al. |
| 9,960,637 B2 | 5/2018 | Sanders et al. |
| 10,095,863 B2 | 10/2018 | Simha et al. |
| 10,116,702 B2 | 10/2018 | Knjazihhin et al. |
| 10,142,164 B2 | 11/2018 | Ramachandran et al. |
| 10,547,562 B2 | 1/2020 | Kumar et al. |
| 10,554,765 B2 * | 2/2020 | Chunduru Venkata ..................... H04L 41/0843 |
| 2006/0253586 A1 | 11/2006 | Woods |
| 2006/0265344 A1 | 11/2006 | Woods |
| 2007/0073697 A1 | 3/2007 | Woods |
| 2007/0180019 A1 | 8/2007 | Woods |
| 2007/0283273 A1 | 12/2007 | Woods |
| 2015/0156079 A1 | 6/2015 | Satterlee et al. |
| 2016/0080285 A1 | 3/2016 | Ramachandran et al. |
| 2016/0080502 A1 | 3/2016 | Yadav et al. |
| 2016/0188877 A1 | 6/2016 | Simha et al. |
| 2016/0294728 A1 | 10/2016 | Jain et al. |
| 2016/0301717 A1 | 10/2016 | Dotan et al. |
| 2017/0230425 A1 | 8/2017 | Knjazihhin et al. |
| 2017/0237679 A1 | 8/2017 | Kumar et al. |

* cited by examiner

INTELLIGENT PROGRAMMABLE POLICIES FOR NETWORK FUNCTIONS

CROSS-REFERENCE TO RELATED APPLICATION

This patent application is a continuation of U.S. patent application Ser. No. 16/723,287, filed on Dec. 20, 2019, which is a continuation of U.S. patent application Ser. No. 16/017,592, filed on Jun. 25, 2018, both entitled Intelligent Programmable Policies for Network Functions, the disclosures of which are incorporated herein by reference in their entirety.

BACKGROUND

Service providers are using software-defined wide area network (SD-WAN) technology to give enterprise customers more flexible, open, cloud-based WAN services, rather than installing proprietary or specialized WAN technology that often involves expensive fixed circuits or proprietary hardware. In an enterprise setup, a customer may have multiple sites/branches and data centers. Every site and data center typically has a SD-WAN device deployed either as a physical or a virtual network function (VNF). Similarly, each site and/or data center may use separate firewall policies and other WAN settings.

DETAILED DESCRIPTION OF THE PREFERRED EMBODIMENTS

The following detailed description refers to the accompanying drawings. The same reference numbers in different drawings may identify the same or similar elements.

Policy configuration and management can be intricate and time-consuming, given the ever-increasing number of applications, user-types, sites, and devices proliferating throughout an enterprise. For example, policies may apply to different combinations of user groups (e.g., accounting, human resources, marketing, etc.), applications (e.g., social media, voice-over-IP, video streaming, enterprise resource planning, etc.), and/or network functions (e.g., firewalls, routing, SD-WAN, etc.). The different network functions may also be provided by different vendors with overlapping functionality. Furthermore, these different combinations of user groups, applications, and network functions may be spread across different sites of an enterprise (such as headquarters, branch offices, data centers, and virtual connectivity platforms).

For example, to make use of an SD-WAN, policies typically have to be configured per device. Policy configuration is generally driven by a vendor-provided element manager or a VNF manager (VNFM). When a network service provider (such as a broadband Internet service provider) sells SD-WAN services from various vendors, there is a need to present a single abstraction layer for the different vendor implementations so that customers can have one experience, with seamless migration from one vendor to the other.

According to implementations described herein, systems and methods are provided to enable customers to configure network policies (e.g., firewall policies, SD-WAN policies, optical WAN policies, etc.) using vendor-agnostic labels. The labels help to abstract low level details, such as an Internet protocol (IP) address for users or an IP address and port for applications. The labels are used by a policy engine to intelligently derive the needed policies at each site. Thus, the systems and methods help a customer to create and maintain one company-wide security policy. For example, once a particular label is deleted on a site, policies using that label can be automatically deleted without separate user interactions for each site.

Figure 1:
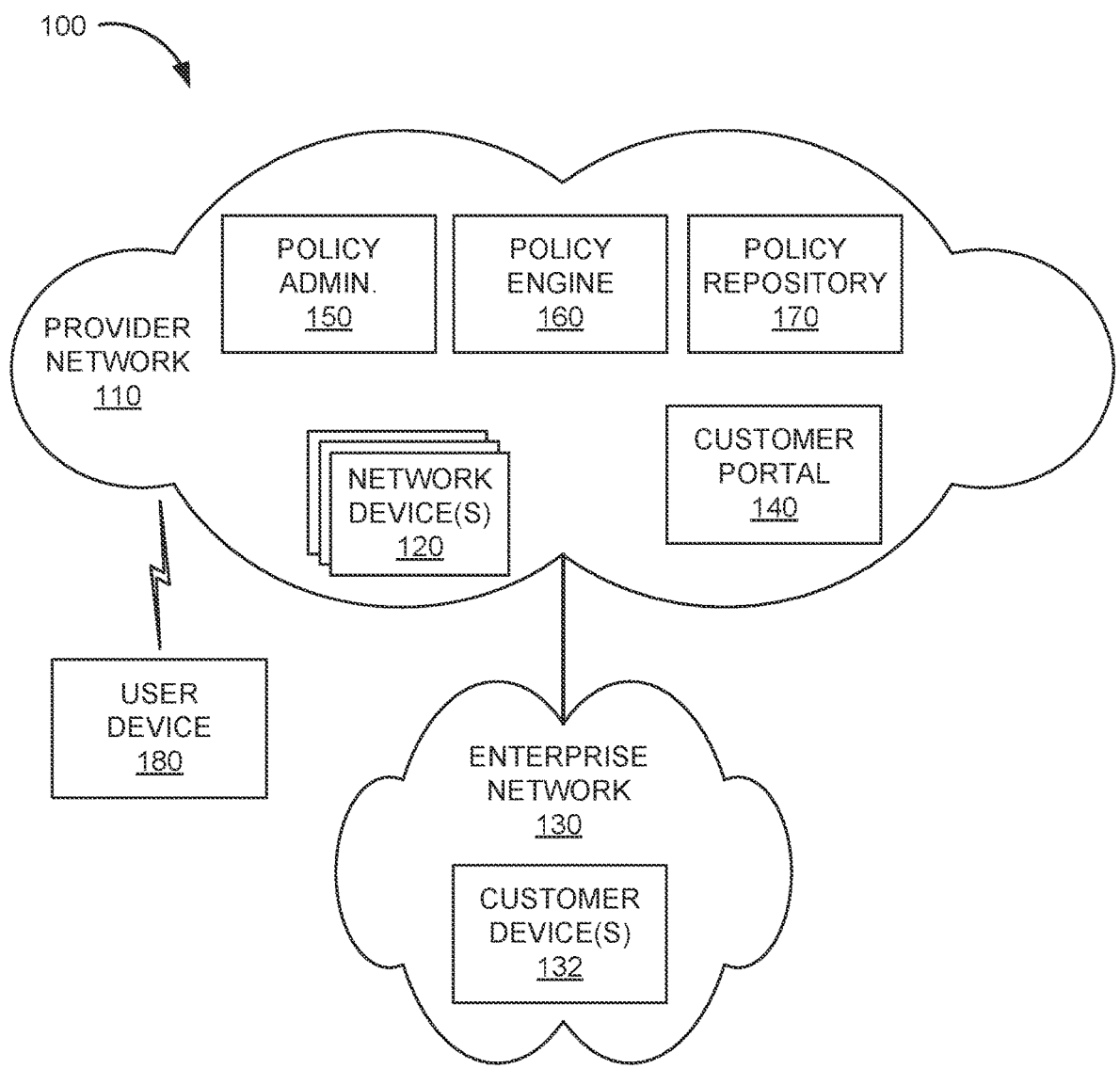
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include a provider network 110 with network devices 120 that provide services to an enterprise network 130. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals, including multi-media signals that may include voice, data and video information. For example, provider network 110 may include one or more access networks, IP multimedia subsystem (IMS) networks, evolved packet core (EPC) networks, or other networks. The access network may include one or more wireless networks and may include a number of transmission towers for receiving wireless signals and forwarding the wireless signals toward the intended destinations. The access network may include a wireless communications network that connects subscribers (e.g., user device 180) to other portions of provider network 110 (e.g., the EPC network). In one example, the access network may include a long-term evolution (LTE) network. In other implementations, the access network may employ other cellular broadband network standards such as 3rd Generation Partnership Project (3GPP) 5G and future standards.

Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data. In an exemplary implementation, provider network 110 may represent a network associated with a service provider that provides various services, such as Internet-protocol (IP) related services, value added services, etc.

Network device 120 may include a device configured to perform network functions in provider network 110. For example, network device 120 may include a switch, a router, a firewall, a gateway, a NAT device, a Reconfigurable Optical Add-Drop Multiplexer (ROADM), and/or another type of network device. Some or all of the functionality of network device 120 may be virtualized as a VNF in provider network 110. Depending on the implementation of network 110, network 110 may include various types of network devices 120, such as, for example, a base station (e.g., an evolved NodeB, a next-generation NodeB, etc.), a gateway device, a support node, a serving node, a mobility management entity (MME), a core access and mobility management function (AMF), a session management function (SMF), a policy control function (PCF), a policy charging rules function (PCRF), as well other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for end devices in customer network 130 (e.g., managed customer devices 132) and other user devices (e.g., user device 180).

Enterprise network 130 may include a customer network that receives services from provider network 110. Enterprise network 130 may include a local area network (LAN), a WAN, or a combination of networks that provide network access to devices in provider network 110. In one implementation, enterprise network 130 may include a network interconnecting one or more customer devices 132, such as devices providing data services (e.g., personal computers, workstations, laptops, etc.), devices providing voice services (e.g., telephones), and/or devices providing video services (e.g., televisions, set-top boxes, etc.). In another implementation, enterprise network 130 may include one or more application servers for user devices 180 (e.g., MTC devices, mobile devices, etc.). The application servers may, for example, receive and process data from user devices 180. In another implementation, enterprise network 130 may include one or more gateway (GW) routers (e.g., customer premises equipment) that act as a secure gateway for devices within enterprise network 130.

According to implementations describe herein, provider network 110 may also include a customer portal 140, a policy administrator 150, a policy engine 160, and a policy repository 170 for an intelligent programmable policies service.

Customer portal 140, according to one implementation, may include a network device that provides SD-WAN policy management services. Users (e.g., customers) of the provider network 110 may manage (e.g., introduce, configure, issue commands, update, monitor, etc.) policies for users, applications and network functions associated with enterprise network 130 via user device 180, for example. In contrast with current SD-WAN practices where each vendor has its own customer portal, customer portal 140 may provide a unified view of all the vendor VNF implementations available through provider network 110.

According to another implementation, customer portal 140 may provide a user interface (e.g., a web site or another network access) to allow a user (e.g., a customer, such as an enterprise network administrator) to access predefined configuration elements and/or micro-service templates that include combinations of predefined configuration elements. The predefined configuration elements may include customer-neutral objects, which can be labeled by the user to identify enterprise user groups (e.g., human resources, accounting, marketing, etc.) and applications (e.g., social media, voice-over-IP, video streaming, enterprise resource planning, etc.). The customer-specific labels may provide abstraction for lower level details such as IP addresses and ports associated with the user groups and applications. Each label may be associated with an enterprise site. Customer portal 140 may allow users to define policies using the labels, while hiding lower level details, such as IP addresses and ports.

Policy administrator 150 may include a network device that forms policy definitions and enables creation of custom policy definitions based on user input to customer portal 140.

Policy engine 160 may include a network device that receives policies from policy administrator 150 and applies analytics to generate policies for enforcement at particular enterprise sites. Policy engine 160 may contain the algorithms and workflows for policy management. Policy engine 160 may analyze application analytic data, a state of an application, and a policy to be administered to determine viability. For valid policies, policy engine 160 may create directions for policy enforcement (e.g., by network devices 120).

Policy repository 170 may include a database or another type of storage for custom and recommended policies by customers/site. In on implementation, policy repository 170 may include separate storage for abstract micro-service (e.g., policy) templates that are not related to any specific customer or vendor, vendor-agnostic micro-service templates that are related to a specific customer, and vendor-specific micro-services (e.g., related to a specific customer and vendor). The abstract micro-service templates may be cloned and made available to customers for applying customer-specific labels, creating vendor-agnostic micro-service templates for a particular customer. As described herein, the vendor-agnostic micro-service templates may be converted into vendor-specific micro-services for use by the customer.

User device 180 may include a computational or communication device that is capable of communicating with provider network 110. User device 180 may enable a user to access customer portal 140 or interact with devices in enterprise network 130. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

According to implementations described herein, policy engine 160 may provide to customers (e.g., enterprise network administrators) a micro-service template (e.g., from policy repository 170 and presented via customer portal 140). The micro-services template may be configured from predefined configuration elements. Policy engine 160 may also receive, from a repository of network function data, descriptive information for a vendor-specific micro-service that corresponds to the abstract micro-service template. Customer portal 140 may solicit customer labels for at least some of the predefined configuration elements associated with a group of users for the micro-service on a customer network and other customer labels for predefined configuration elements associated with applications used on the customer network. Policy engine 160 may generate a vendor-agnostic micro-service template using the customer labels and the abstract micro-service template. Upon approval, policy engine 160 may convert, based on the descriptive information, the vendor-agnostic micro-service template into a vendor-specific micro-service template for the customer and generate a network policy for enforcement across multiple sites of the customer network.

Figure 2:
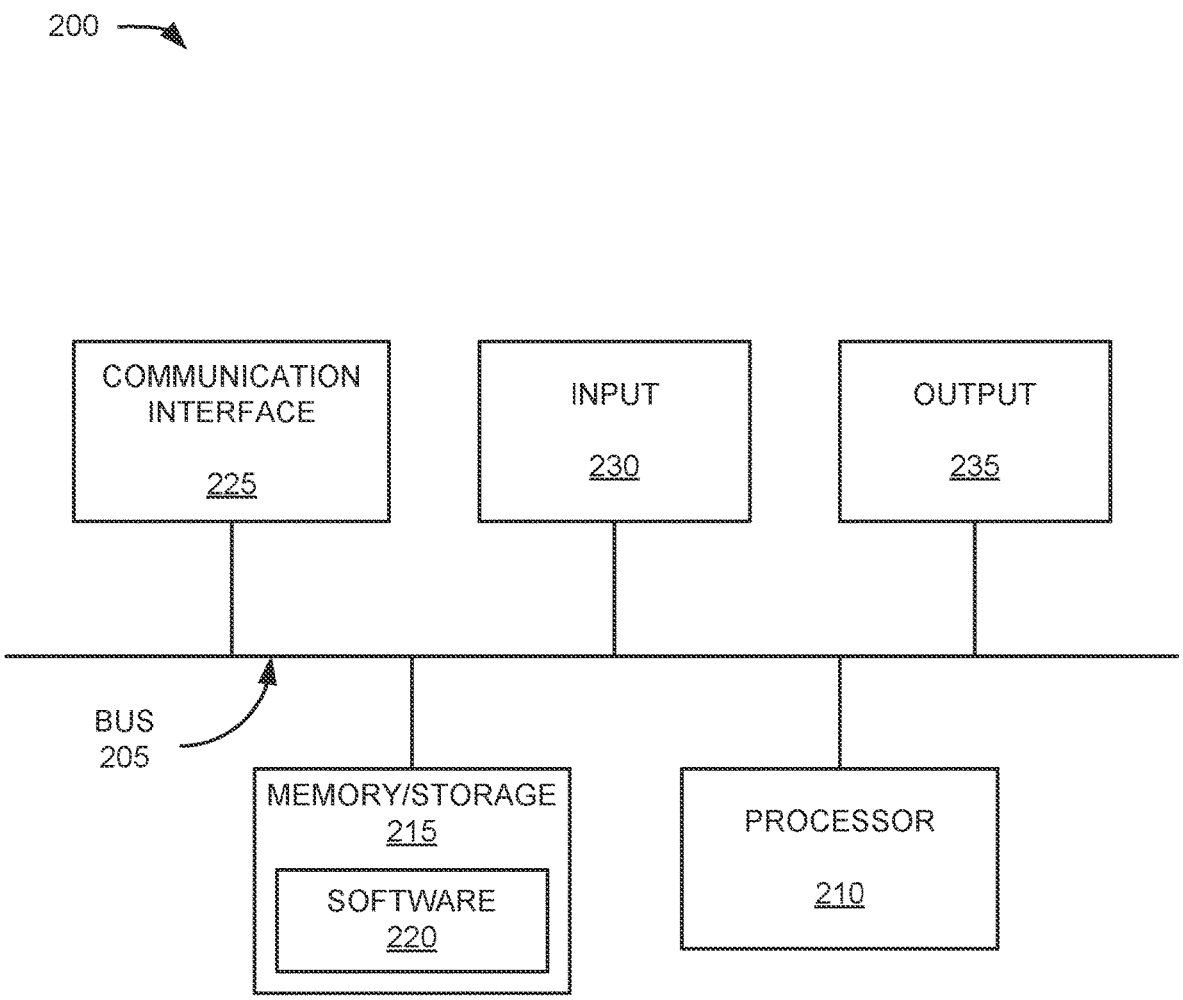
FIG. 2 is a diagram of exemplary components that may be included in one or more of the devices shown in FIG. 1.

FIG. 2 is a diagram illustrating exemplary components of a device 200 that may correspond to one or more of the devices described herein. For example, device 200 may correspond to components included in network device 120, customer device 132, customer portal 140, policy administrator 150, policy engine 160, and user device 180. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction.

Communication interface 225 permits device 200 to communicate with other devices, networks, systems, devices, and/or the like. Communication interface 225 includes one or multiple wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
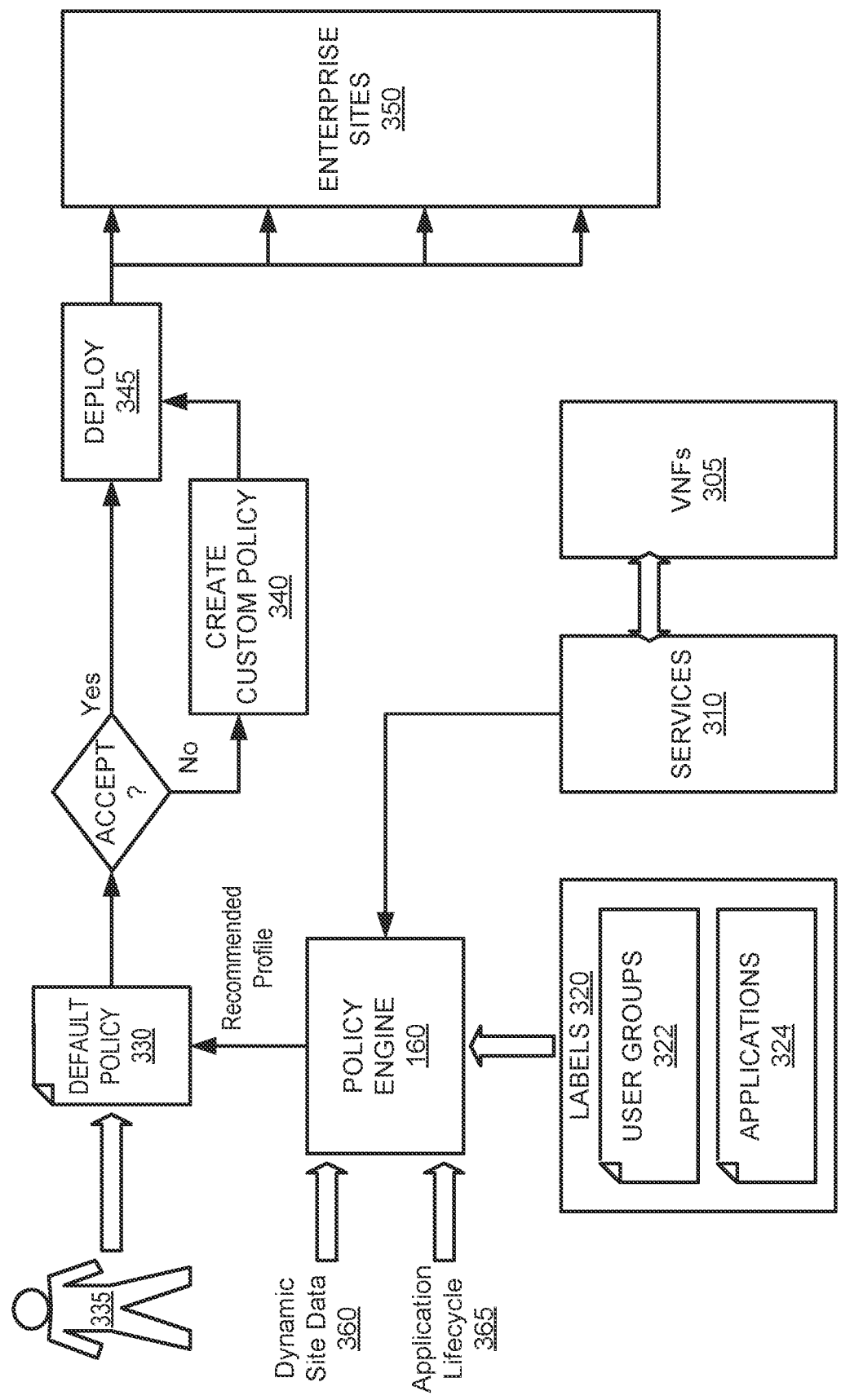
FIG. 3 is a diagram illustrating exemplary communications for implementing intelligent programmable policies for network functions.

FIG. 3 is a diagram illustrating exemplary communications for implementing intelligent programmable policies for network functions. As shown in FIG. 3, vendor-specific VNFs 305 may be made available to enterprise network customers of provider network 110. VNFs 305 may use unique and/or proprietary APIs and other configurations required for customer integration. The vendor-specific VNFs 305 may be grouped as vendor-agnostic services 310, such as "security," "routing," "SD-WAN," "Optical WAN," etc. For example, a vendor may register a VNF with provider network 110 and include a vendor-agnostic service category as part of the registration process. In another implementation, policy administrator 150 may assign one or more vendor-agnostic service categories for each VNF 305. Vendor-agnostic services 310 may be presented to users via customer portal 140 such that generic vendor policy terms can be used to present consistent policy across different VNF vendor implementations. Thus, the user can be presented with a consistent set of service terms, which may simplify customer migration from one vendor to the other.

A user (e.g., an enterprise network administrator) may provide labels 320 for user groups 322 and applications 324 that are particular to enterprise network 130. For example, using customer portal 140, a user may create labels, identifying group of users at each site and identifying applications running at each site. For example, individual employee accounts and/or end devices may be grouped together under an appropriate label in user groups 322, such as "human resources," "accounting," "sales," "engineering," etc. Similarly, one or more applications running on enterprise network 130 may be associated with a vendor-agnostic label in applications 324, such as "VoIP," "streaming media," "social media," etc. In one implementation, an application discovery tool may be used to automatically discover applications running at each site in enterprise network 130. Multiple sites may have users from the same department, so that a user group may span multiple sites (e.g., an "Engineering dept." label can be associated with any site that has an engineering team). Similarly, an instance of an application can be run in different sites. Labels may be used to genericize low level details like IP addresses, ports, etc., associated with users and applications.

According to an implementation, a combination of user groups 322, applications 324, and services 310 may be selected by the user (e.g., via customer portal 140) and submitted to policy engine 160. Policy engine 160 may use labels 320 to intelligently derive policies needed for the customer at each site. For example, based on a recommended profile derived from labels 320, policy engine 160 may provide a default policy 330, such as a security policy, for inspection by the user. In one implementation, a user 335 may request (e.g., via customer portal 140) a particular type of policy. Thus, default policy 330 may include, for example, a firewall policy, an SD-WAN policy, or the like, that can be implemented by network devices 120 for enterprise network 130. In another implementation, policy engine 160 may provide a comprehensive group of policies that relate to selected labels 320 and/or services 310 selected by a user.

The user 335 may review default policy and decide whether to accept or reject default policy 330. If the user determines that default policy 330 is not acceptable, the user can modify default policy 330 to create a custom policy 340. The accepted default policy 330 or the created custom policy 340 may be deployed 345. Deployment may include, for example, validating policy 330/340 and providing the policy to applicable network devices 120 that can enforce the policy on applicable sites 350 across enterprise network 130.

Still referring to FIG. 3, in some instances, policy engine 160 may provide dynamic policy recommendations (e.g., to user 335). For example, policy engine 160 may obtain dynamic site data 360, such as telemetry data from application performance monitoring/analytics systems (e.g., APPDYNAMICS, TURBONOMIC, etc.). Based on dynamic site data 360, policy engine 160 may identify a policy recommendation, such as performance tuning or site migration to optimize cost. Policy recommendations may be provided, for example, to user 335 as a new default policy 330 or a revision to a custom policy 340.

In another implementation, policy engine 160 may receive application lifecycle data 365. Generally, lifecycle events for an application, such as new deployment, performance tuning, migration, and sunset, may require reconfiguration of set policies. In conventional environments, manual site-level policy configurations are required for each of these lifecycle events. According to implementations described herein, application lifecycle events may be scheduled or indicated to policy engine 160. Adjustment or changes to a label may be input as a single change (e.g., using customer portal 140) and populated by policy engine 160 throughout all sites of enterprise network 130. For example, once a particular label (e.g., one of labels 320) is deleted on a site, policies using that label may be automatically deleted. Thus, removal of an application label 324 (e.g., indicating sunset of an application) may result in policy engine 160 automatically updating policies for one or all sites of enterprise network 130.

Although FIG. 3 shows exemplary communications for implementing intelligent programmable policies, in other implementations more, fewer or different communications may be used.

Figure 4:
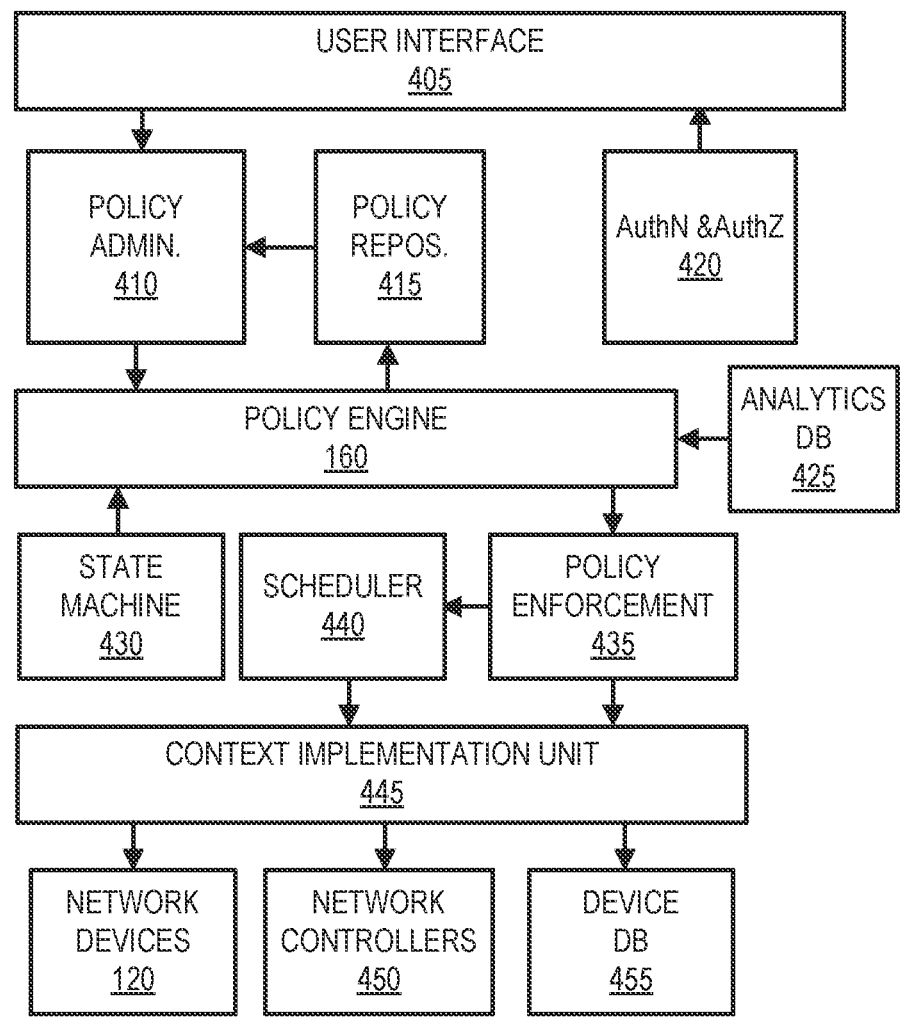
FIG. 4 is a block diagram of exemplary logical components of a unified policy management framework, according to an implementation.

FIG. 4 is a block diagram of exemplary logical components of a unified policy management framework 400, according to an implementation. As shown in FIG. 4, unified policy management framework 400 may include network devices 120, policy engine 160, a user interface 405, a policy administration module 410, a policy repository 415, an authentication and authorization module 420, an analytics database 425, a state machine 430, a policy enforcement module 435, a scheduler 440, and a context implementation unit 445. Unified policy management framework 400 may enable abstract policy communication from other network layers.

User interface 405 may be provided via customer portal 140 to solicit user input for labels (e.g., user groups 322 and applications 324). User interface 405 may also allow users to add labels to policy templates.

Policy administration module 410 may enable policy definition and creation of custom policy definition, attach labels to user groups (e.g., IP addresses) and applications (e.g., IP addresses, ports, etc.) based on user input via user interface 405.

Policy repository 415 may store custom policies (e.g., custom policy 340) and recommended policies (e.g., default policy 330) by customers/site. In another implementation, policy repository 415 may be included within policy repository 170. In this implementation, policy repository 415 may store vendor-specific policy templates (e.g., default policy 330 and custom policy 340) along with abstract policy templates and vendor-agnostic policy templates as described above in connection with policy repository 170.

Authorization (AuthN) and authorization (AuthZ) module 420 may integrate with lightweight directory access protocol (LDAP) for authentication and authorization of applications. Analytics database 425 may receive and store dynamic site data (e.g., dynamic site data 360) from application performance monitoring/analytics systems. State machine 430 may monitor the state of applications within each enterprise network 130. In one implementation a separate state machine 430 may be used for each application instance.

As described above, policy engine 160 is the controller of the unified policy management framework 400, containing the algorithms and workflows for policy management. In one implementation, policy engine 160 may analyze application analytics stored in analytics database 425, the state of an application (e.g., from state machine 430), and a policy to be administered (e.g., from policy administration module 410). Based on this analysis, policy engine 160 may create directions for policy enforcement module 435.

Policy enforcement module 435 may receive commands/instructions from policy engine 160 and may break down policy guidelines to individual instances for enforcement. Scheduler 440 may receive, from policy enforcement module 435 or another component (e.g., user interface 405), a specified schedule for implementing a new policy or policy change. Scheduler 440 may take into account activation dates for new applications, network loads, etc.

Context implementation unit 445 may map policies to be enforced to the relevant device context (e.g., protocol mapping, etc.). For example, context implementation unit 445 may map policies for network devices 120, network controllers 450, and one or more device databases 455.

While FIG. 4 illustrates exemplary logical components of unified policy management framework 400, according to other embodiments, unified policy management framework 400 may include additional, different, and/or fewer logical components.

Figure 5:
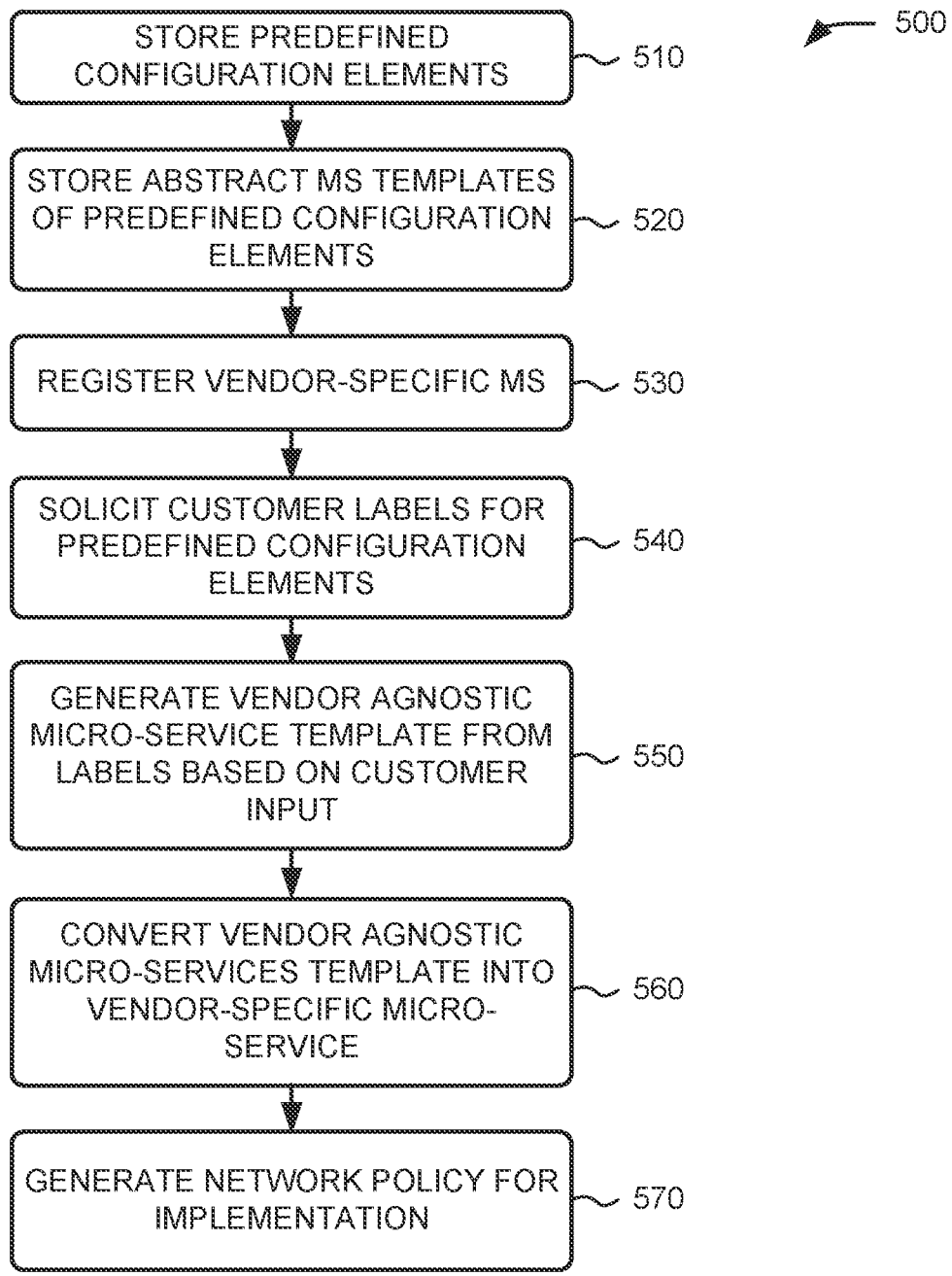
FIG. 5 is a flow diagram illustrating an exemplary process for implementing intelligent programmable policies for network functions, according to an implementation described herein.

FIG. 5 is a flow diagram illustrating an exemplary process 500 for implementing intelligent programmable policies for network functions, according to an implementation described herein. In one implementation, process 500 may be implemented by one or more devices in unified policy management framework 400. In another implementation, process 500 may be implemented by policy engine 160 in conjunction with one or more other devices in network environment 100.

Process 500 may include storing predefined configuration elements (block 510). For example, a network operator may configure and store predefined configuration elements in a vendor agnostic micro-service (VAMS) database (e.g., policy repository 170). In one implementation, any generic object may be considered as a predefined configuration element. A generic object may include, for example, a group placeholder, an application placeholder, a Service Level Agreement (SLA) placeholder, etc. A generic object should not have any property which is related to a particular customer (e.g., an IP Address object is related to a customer and would not be considered as a predefined configuration element). Predefined configuration elements may not be tied to any customer until they are later cloned for a particular customer. Predefined configuration elements may be stored separately from cloned models.

Process 500 may further include storing abstract micro-service templates from the predefined configuration elements (block 520). For example, a network operator may configure and store abstract micro-service templates in the VAMS database. Predefined configuration set templates may include a group of templates with each template including of set of predefined configuration elements. The predefined configuration elements used in the templates are generic elements and are not related to any customer (e.g., the templates and predefined configuration elements do not have any IP address elements). The templates may not be tied to any customer until they are cloned for a particular customer. The templates may be will be stored in separate data models. After cloning, a customer can create more versions by modifying the templates.

Process 500 may further include receiving registration information for a vendor-specific micro-service (block 530). For example, authorized vendors may register vendor-specific micro-services (e.g., VNFs) as vendor-agnostic micro-services. Using APIs from provider network 130, vendors may provide micro-service details, such as a VNF name, a VNF version, a category, a vendor ID, a network address (e.g., a URI), a port, and driver details.

Process 500 may also include soliciting customer labels (block 540). For example, the unified policy management framework 400 may solicit, via customer portal 140, labels from a customer/user. The customer may create labels identifying different various groups of users like HR Dept., Engineering Dept., Financial Dept., etc., and identifying applications running at each data center (e.g., composition of each site). The labels help to abstract low level details, such as IP addresses in case of users or IP addresses and ports in case of applications.

Figure 6:
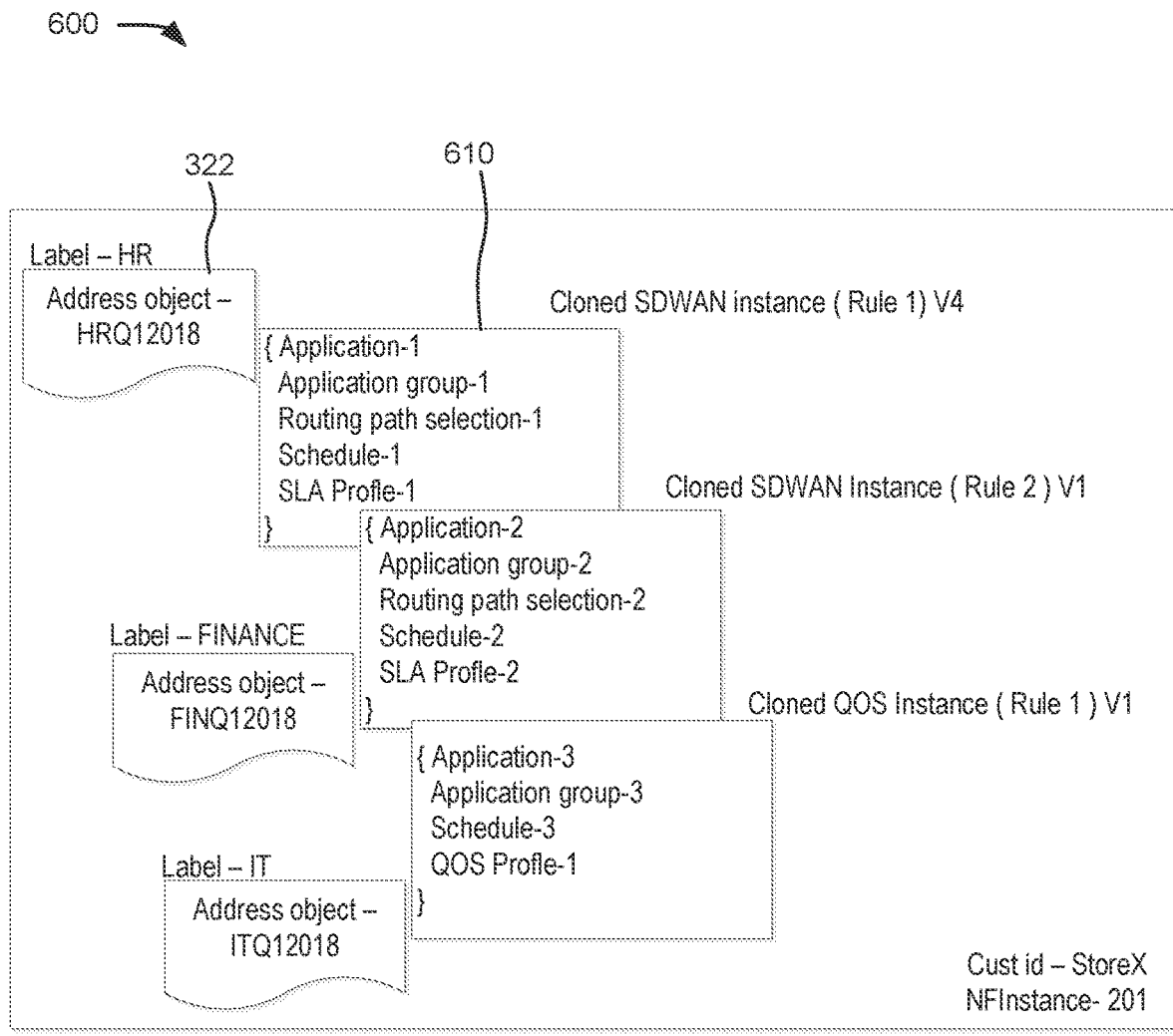
FIG. 6 is a schematic of labels applied to cloned pre-defined configuration elements.

Process 500 may additionally include generating a vendor-agnostic micro-services template from labels based on customer input (block 550). For example, using customer portal 140, a user may arrange labels to define firewall and/or SD-WAN policies in light of service level agreements, quality of service requirements, etc. In one implementation, customer portal 140 may guide the user to clone a predefined configuration element to inherit it (e.g., creating a copy of configuration element and link it to a customer identifier) or create new configuration element and link it with the customer identifier. Customer portal 140 may guide the user to clone a predefined configuration set template to inherit it or create a custom configuration set template and link it with the customer identifier. In one implementation, a user may modify inherited configuration templates by adding/removing/updating any configuration element which belongs to the customer and saving the modified version as a new owned template with new version identifier. FIG. 6 provides a schematic of labels 322 applied to cloned predefined configuration elements 610 in a vendor-agnostic micros-service template. The user arrangement may be saved as a "to be applied configuration" in, for example, a VAMS portion of policy repository 170.

Returning to FIG. 5, process 500 may include converting the vendor agnostic micro-services template into vendor-specific micro-service (block 560). For example, policy engine 160 may receive the "to be applied configuration" with the customer-specific, vendor-agnostic policy information saved by the customer. Policy engine 160 may use information from vendor registrations (e.g., provided in the vendor micro-service registration of block 520) to pull vendor specific data for particular VNFs 305. For example, policy engine 160 may match registered categories and features of a specific VNF 305 to categories and requirements from the "to be applied configuration." Policy engine 160 may confirm site information, VNF information, customer information and create a vendor-specific micro-service (VSMS) instance for the customer. The VSMS instance may be stored, for example, in a VSMS portion of policy repository 170.

Process 500 may further include generating a network policy for enforcement by network devices in the provider network (block 570). For example, policy engine 160 may create directions for policy enforcement module 435, and policy enforcement module 435 may receive directions from policy engine 160 and may break down policy guidelines to individual instances for enforcement by network devices 120.

Because the firewall and SD-WAN policies are defined using labels instead of IP addresses, the firewall or SD-WAN policy can be re-usable across different sites of enterprise network 130. Since labels are associated to each site, policy engine 160 can intelligently derive the needed policies at each site. Thus, the systems and methods described herein help customers to create and maintain one company-wide security policy. If a security or access policy changes, a one-time update can be used for the company-wide policy. Conventional methods, by contrast, would require separate updates up to number of NF instances.

Furthermore, with security policy based on users and applications as described herein, once a particular label is deleted on a site, policies using that label may also be automatically deleted. Visualization in customer portal 140 can have full insights into how users access applications or application interaction with other applications etc. Also, when modifications to company policy are required, changes for one site may cause changes at all the sites.

Figure 7:
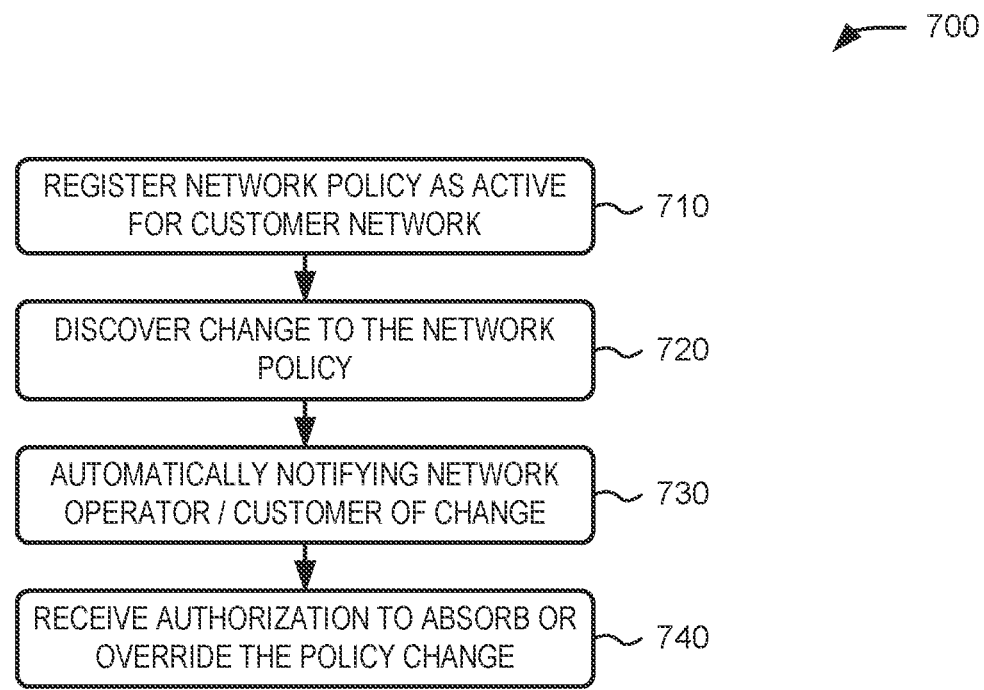
FIG. 7 is a flow diagram illustrating an exemplary process for identifying policy conflicts for network functions, according to an implementation described herein.

While implementations describe herein allow a customer using customer portal 140 to configure a firewall or SD-WAN policy, in some instances a provider network administrator may need to manually change a network function configuration, without using customer portal 140. FIG. 7 is a flow diagram illustrating an exemplary process 700 for identifying policy conflicts for network functions, according to an implementation described herein. In one implementation, process 700 may be implemented by policy engine 160. In another implementation, process 700 may be implemented by policy engine 160 in conjunction with one or more devices in unified policy management framework 400.

As shown in FIG. 7, a network policy for a customer network may be registered as active (block 710). Generally, policy engine 160 acts as a sole reference point (e.g., single source of truth) for customer policies, which may be stored in policy repository 170. Policy engine 160 may automatically increment the version of the policy configuration sets and policy elements upon every change made through customer portal 140. At any point of time, policy engine 160 assigns one version of a policy configuration set as the active configuration. The version updates may enable asynchronous updates to be tracked and implemented in policy engine 160.

Process 700 may also include discovering changes to the network policy (block 720) and notifying a network operator and/or customer (block 730). For example, any policy changes entered outside of customer portal 140 may be discovered by the unified policy management framework 400. For example, discovery of policy changes initiated outside of customer portal 140 may be accomplished either by acting on a login/audit/syslog event generated by the impacted network function, or triggered by scripts or external programs. In response to discovery of a policy change and prior to implementation, policy engine 160 may automatically notify a designated network operator and/or customer representative to present differences between and active policy configuration (e.g., as labeled by policy engine 160) versus a discovered configuration (e.g., which may have been initiated outside of customer portal 140). The notification may include, for example, an email, text message, or instant message directed to the designated network operator and/or customer representative.

Process 700 may further include receiving authorization to accept or reject the policy change (block 740). For example, the designated network operator and/or customer representative may receive the notification and log into the unified policy management framework 400. The designated network operator and/or customer representative may review the differences and decide to either absorb or override the discovered policy configuration. The designated network operator and/or customer representative may provide a corresponding approval/rejection signal to policy engine 160.

Figure 8:
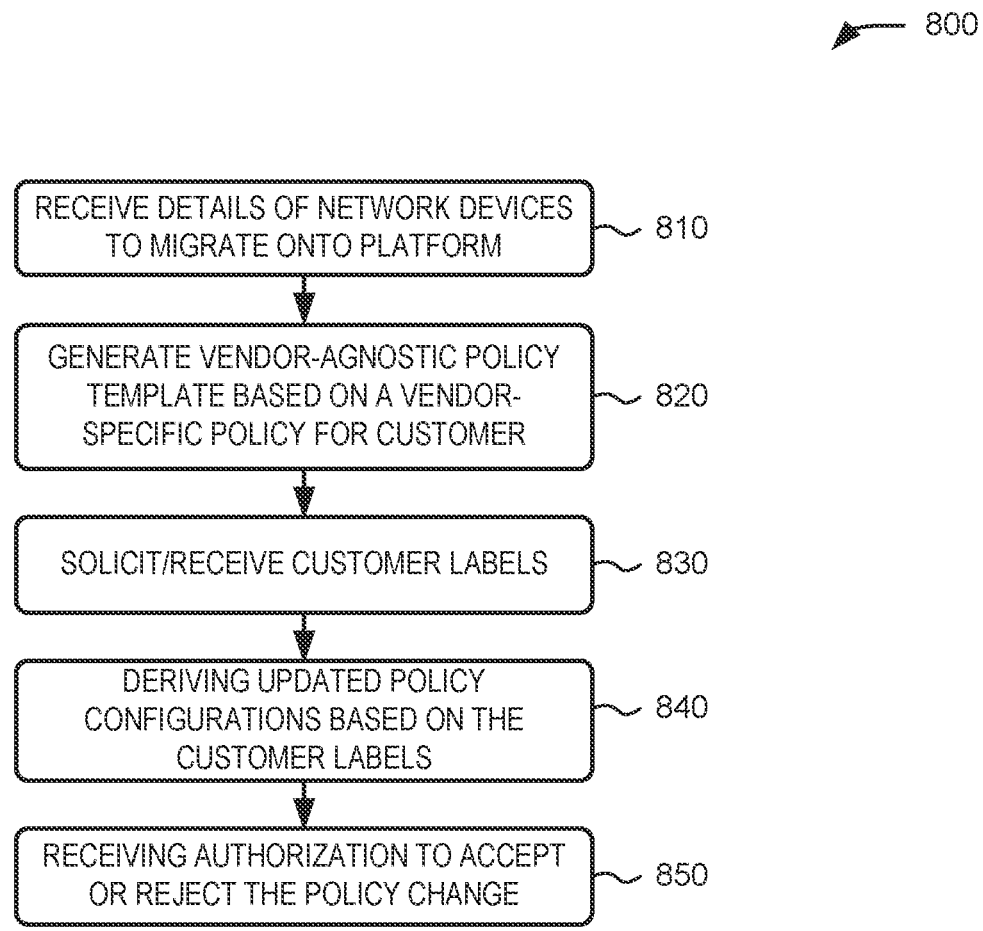
FIG. 8 is a flow diagram illustrating an exemplary process for integrating legacy devices, according to an implementation described herein.

In some instances, new policies may be incorporated into legacy systems. FIG. 8 is a flow diagram illustrating an exemplary process 800 for integrating legacy devices, according to an implementation described herein. In one implementation, process 800 may be implemented by policy engine 160. In another implementation, process 800 may be implemented by policy engine 160 in conjunction with one or more devices in unified policy management framework 400.

Process 800 may include receiving network device details for new devices migrating onto a customer platform (block 810). For example, an operator inputs the details of additional customer devices 132 to migrate onto a platform (e.g., for enterprise network 130)

Process 800 may also include generating a vendor-agnostic micro-service template based on a vendor-specific micro-service policy for the customer (block 820) and soliciting and receiving customer labels (block 830). For example, policy engine 160 may discover and retrieve the vendor-specific configurations associated with the customer and build abstract data models that are vendor agonistic. The customer may then use customer portal 140 to create labels based on composition of the customer sites. The customer may then map the labels to the IP address objects (e.g., on customer devices 132) and applications, if any.

Process 800 may include deriving updated policy configurations based on the customer labels (block 840). For example, policy engine 160 may derive a policy configuration set based on the discovered configurations and the mapped customer labels. For example, policy engine 160 may insert the newly-mapped labels and previously-existing labels into the derived vendor-agnostic policy configurations for the customer.

Process 800 may further include receiving authorization to accept or reject the policy change (block 850). For example, customer portal 140 may present the updated policy configuration to the customer. Once the customer reviews the updated policy configuration based on the discovered configurations, policy engine 160 may save the updated policy configuration as the active version with a new version number (e.g., auto set to 1). Any changes made to the policy configuration after that point may have the version number auto incremented.

Systems and methods described herein provide unified policy management framework network functions in enterprise networks. The systems and methods store an abstract micro-service template configured from predefined configuration elements; receive descriptive information for a vendor-specific micro-service that corresponds to the abstract micro-service template; solicit first customer labels for at least some of the predefined configuration elements associated with a group of users for the micro-service on a customer network; solicit second customer labels for other of the predefined configuration elements associated with applications used on the customer network; generate a vendor-agnostic micro-service template using the first customer labels, the second customer labels, and the abstract micro-service template; convert, based on the descriptive information, the vendor-agnostic micro-service template into a vendor-specific micro-service template for the customer; and generate, by the network device and based on the vendor-specific micro-service template, a network policy for enforcement across multiple sites of the customer network.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 5, and message/operation flows with respect to FIGS. 3 and 4, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by one or more computing devices, the method comprising:
   soliciting customer user labels and customer application labels associated with predefined configuration elements;
   generating a service template using the customer user labels, the customer application labels, and the predefined configuration elements;
   converting the service template into a vendor-specific service for the customer; and
   generating a network policy for enforcement of the vendor-specific service.

2. The method of claim 1, wherein the customer user labels are associated with Internet protocol (IP) addresses for a group of users.

3. The method of claim 1, wherein the customer application labels are associated with Internet protocol (IP) addresses and ports for applications.

4. The method of claim 1, wherein the predefined configuration elements include a driver for a network function.

5. The method of claim 1, further comprising:
   enforcing the network policy.

6. The method of claim 1, further comprising:
   discovering a change to the network policy, wherein the change is made outside of a customer portal; and
   providing a notification of the change to the network policy.

7. The method of claim 6, wherein the providing includes presenting differences between an active policy configuration and the change to the network policy.

8. The method of claim 1, wherein the network policy governs a virtual network function (VNF).

9. One or more computing devices, comprising:
   a communication interface to communicate with network devices; and
   one or more processors configured to:
      solicit customer user labels and customer application labels associated with predefined configuration elements;
      generate a service template using the customer user labels, the customer application labels, and the predefined configuration elements;
      convert the service template into a vendor-specific service for the customer; and
      generate a network policy for enforcement of the vendor-specific service.

10. The one or more computing devices of claim 9, wherein the customer user labels are associated with Internet protocol (IP) addresses for a group of users.

11. The one or more computing devices of claim 9, wherein the customer application labels are associated with Internet protocol (IP) addresses and ports for applications.

12. The one or more computing devices of claim 9, wherein the predefined configuration elements include a driver for a network function.

13. The one or more computing devices of claim 9, wherein the one or more processors are further configured to enforce the network policy.

14. The one or more computing devices of claim 9, wherein the one or more processors are further configured to:
   discover a change to the network policy, and
   automatically provide a notification of the change to the network policy.

15. The one or more computing devices of claim 14, wherein, when automatically notifying, the one or more processors are further configured to:
   present differences between an active policy configuration and the change to the network policy.

16. The one or more computing devices of claim 9, wherein the network policy governs a physical network device.

17. A non-transitory computer-readable medium containing instructions executable by at least one processor, the computer-readable medium comprising one or more instructions to cause the at least one processor to:

solicit customer user labels and customer application labels associated with predefined configuration elements;

generate a service template using the customer user labels, the customer application labels, and the predefined configuration elements;

convert the service template into a vendor-specific service for the customer; and generate a network policy for enforcement of the vendor-specific service.

18. The non-transitory computer-readable medium of claim 17, wherein the customer user labels are associated with Internet protocol (IP) addresses for a group of users, and wherein the customer application labels are associated with Internet protocol (IP) addresses and ports for applications.

19. The non-transitory computer-readable medium of claim 18, further comprising instructions to cause the at least one processor to:

register the network policy as active for the customer network; and automatically provide a notification when a change to the network policy is detected.

20. The non-transitory computer-readable medium of claim 18, further comprising instructions to cause the at least one processor to:

receive device details for devices migrating onto a customer platform;

generate a vendor-agnostic policy template based on a vendor-specific policy for the customer network;

solicit and receive customer labels; and derive updated policy configurations based on the customer labels.

* * * * *